United States Patent [19]

Thomas

[11] Patent Number: 5,044,316

[45] Date of Patent: Sep. 3, 1991

[54] VENTILATED ANIMAL CAGING SYSTEM WITH CAGE RACKS AND FILTER COVERS INCLUDING VALVES OPERABLE BY RACK

[75] Inventor: William R. Thomas, Conyngham, Pa.

[73] Assignee: Thoren Caging Systems, Inc., Hazleton, Pa.

[21] Appl. No.: 500,068

[22] Filed: Mar. 28, 1990

[51] Int. Cl.$^5$ .............................................. A01K 1/03
[52] U.S. Cl. ........................................ 119/15; 119/17
[58] Field of Search ................................... 119/15, 17

[56] References Cited

U.S. PATENT DOCUMENTS

| | | | |
|---|---|---|---|
| 3,343,520 | 9/1967 | Schwarz, Jr. | 119/15 |
| 3,528,227 | 9/1970 | Lee et al. | 55/524 |
| 3,769,936 | 11/1973 | Swanson et al. | 119/15 |
| 4,249,482 | 2/1981 | Harr | 119/17 |
| 4,343,261 | 8/1982 | Thomas | 119/15 |
| 4,365,590 | 12/1982 | Ruggieri | 119/15 |
| 4,402,280 | 9/1983 | Thomas | 119/17 |
| 4,480,587 | 11/1984 | Sedlacek | 119/15 |
| 4,593,650 | 6/1986 | Lattuada | 119/15 |
| 4,640,228 | 2/1987 | Sedlacek et al. | 119/15 |

FOREIGN PATENT DOCUMENTS 2065440  7/1981  United Kingdom .

Primary Examiner—John G. Weiss
Attorney, Agent, or Firm—Eckert Seamans Cherin & Mellott

[57] ABSTRACT

A ventilated caging system of the type having ducted shelves with lower planar surfaces for box-like animal enclosures, the shelves having duct openings for powered supply and exhaust of air to the animal cages, has valved filter covers operable to isolate the animal enclosure from ingress and egress of airborne particles. The filter cover has a frame sealingly engaging a perimeter of the cage, the frame carrying a filter membrane with at least one opening. A support web integral with the frame extends inwardly of the perimeter within the frame to support a valve. A movable valve body in the form of a leaf spring is mounted on the support web, the valve body including a blocking portion resiliently urged to block the opening in the filter membrane, and a contact portion protruding through the opening by an opening displacement of the valve body, the blocking portion being displaced by the contact portion when the cage is fitted in the ventilating rack, whereupon the valve is opened, and the blocking portion being resiliently released to cover the opening when the cage is removed from contact with the ventilating rack, whereupon the valve is closed.

20 Claims, 2 Drawing Sheets

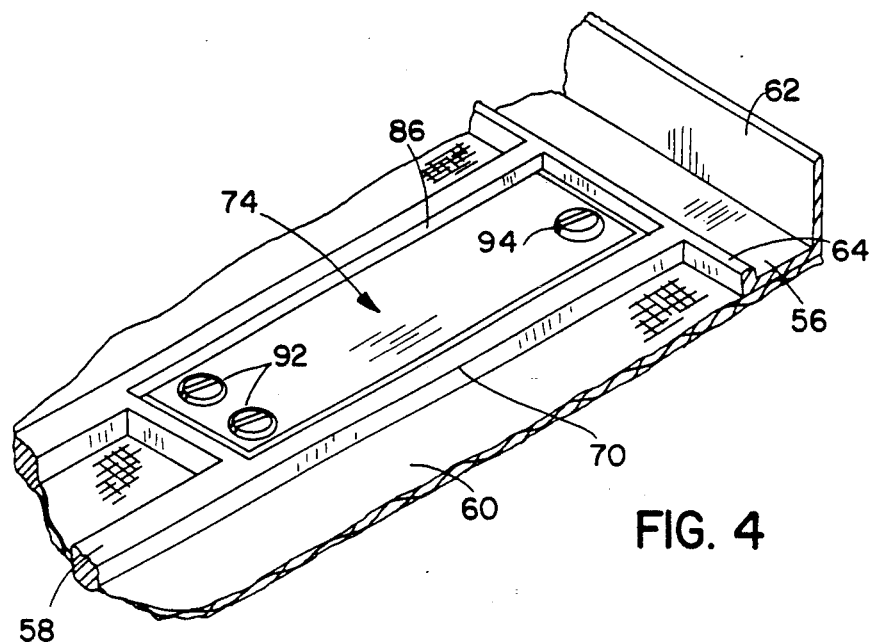
FIG. 4
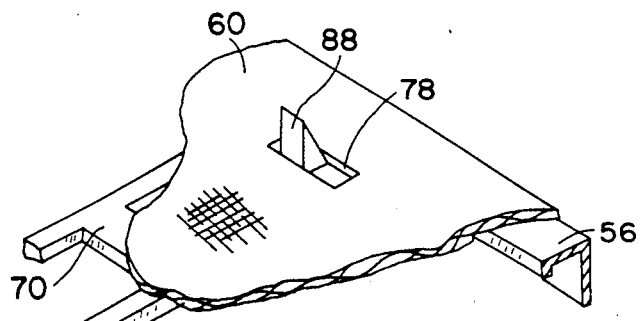
FIG. 5
FIG. 6
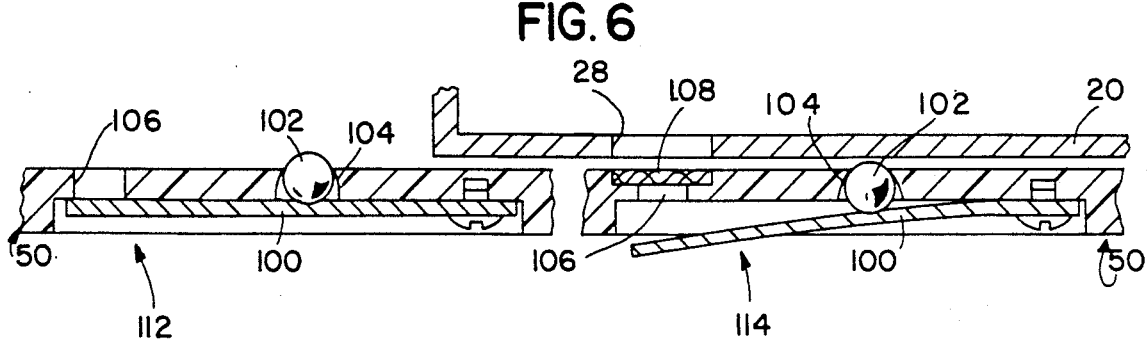

VENTILATED ANIMAL CAGING SYSTEM WITH CAGE RACKS AND FILTER COVERS INCLUDING VALVES OPERABLE BY RACK

BACKGROUND OF THE INVENTION

1. Field of the Invention

This invention relates to the field of high density animal housing systems, for example as used to house laboratory animals such as experimental mice, wherein each cage is individually ventilated and the occupants of each cage are to be isolated from airborne particles from other cages which may carry contagion.

2. Prior Art

High density animal caging systems are known, for example as disclosed in U.S. Pat. No. 4,343,261 - Thomas, wherein the animals are housed in box-like enclosures which are airtight on their sides and bottoms and are adapted to fit to ducted shelves such that open tops of the cages fit against the ducted shelves in the area of air supply and air exhaust openings. When the cages are fitted into place under the shelves, for example being slid under the shelves along complementary supporting flanges on the cages and shelves, respectively, air flow is established through the cage. The internal ducts of the shelves are connected to a powered airflow means typically including a HEPA filter or the like for removing particulate matter. Clean air is carried along the shelf ducts to each cage and used air, which may also contain particulate matter, is carried away via the exhaust ducts. This arrangement accomplishes individual ventilation of the cages, allowing for high density animal housing as appropriate for laboratories and the like.

Animal cages require regular maintenance. Used bedding material must be removed, and food and water must be added. If the animals are housed in open topped cages, there is a period of exposure to particulate material from other animals when a cage is removed from the ducted shelf rack for such maintenance. Particulate matter in the form of airborne dust and dander can carry various diseases, a very serious example being infantile diarrhea in mice, which can cause extensive mortality in breeding colonies. Typically, clean cage boxes and bedding are made available and upon removal of a cage from the ducted rack the animals are transferred to a clean cage box with required food and water, whereupon the cage is replaced in the rack. The original bedding is discarded and the original cage is cleaned. The transfer operation can be conducted in a protected environment, for example in a hooded maintenance enclosure with a laminar air flow pattern to reduce the escape of dander, bedding particles and other potential disease vectors. However, the cage and its occupants still are exposed at least when being slid into or out of engagement with the ducted rack. According to the aforesaid patent to Thomas, it is possible to include a cover on the cages to prevent this period of exposure. A cage cover having valves which align with the air inlets and outlets is placed over each cage, the cover fitting between the cage and the shelf. The valves are spring biased to close and are opened against the spring bias by contact with the underside of the shelf. When the cage is inserted, the valves open; and when the cage is removed, the valves close.

The particular valves employed in Thomas have cylindrical valve bodies movable in tubular valve housings in a direction perpendicular to the plane of the cage cover for opening and closing the air flow path. The remainder of the cover is airtight plastic, being sealed to the perimeter of the cage by an appropriate resilient seal means which engages with the cage along its upper edges. Helical springs urge the valve bodies upwardly into the closed position. In the open position, a piece of filter material within the valve prevents any particulate material from being drawn out of the cage and into the exhaust ducts of the rack.

The valves in the Thomas disclosure are effective, but expensive to provide and to maintain. Moreover, when the valves are closed, there is no possibility of air flow to the animals, presenting a danger of suffocation if the cage is left too long out of the ducted rack and/or if a valve is not operated properly, for example due to clogging or due to an improper fit between the cage and the rack. In order to ensure a proper fit, the cage flanges and the complementary shelf flanges must be relatively precisely positioned and dimensioned. The animal maintenance technician must ensure that each cover is properly in place such that the covered cage will fit into the shelf. Each cage must be inserted fully to align the valves and their respective ducts. Care must be taken that the valves do not become clogged, because air flow can occur only through the valves.

Animal housing systems are known wherein the cages are covered by filter material rather than by an airtight cover. Examples are disclosed in U.S. Pat. Nos. 3,343,520 - Schwarz, Jr.; U.S. Pat. No. 3,528,277 - Lee et al; 4,480, 587 - Sedlacek; and British Patent 2,065,440 - Bernardini. The covered cages are not adapted for use in cage racks with internal air ducts. In filter covered cages the body heat of the cage occupants produces thermal currents that cause an exchange of air with the outside. Over time, filter covers can become clogged with particles, reducing the air exchange; however, the surface area available for air exchange is much larger than the surface area available through a valve as in Thomas.

U.S. Pat. No. 4,593,650 - Lattuada discloses a filter covered cage with a powered air inlet which is plugged into the cage, thereby forcing air outwardly through the cage and ensuring ventilation. However, the plugged connection requires individual attention in aligning the cage and the air supply plug, and in ensuring an operative connection.

Filter covers which are self supporting are typically made of bonded fibers and adhesive. The adhesive tends to occupy spaces between the fibers and to block air flow. The foregoing patents to Sedlacek, Lattuada and Bernardini support or sandwich a sheet of filter material between frame elements, for example perforated plates. The perforated plates also tend to limit air flow. Moreover, such composite structures are unduly thick. The filter covers also must be assembled and used filter sheets must be replaced, making it difficult to simply process a used filter cover via a cleaning process such as autoclaving.

The present invention employs a cage cover wherein a filter material of spunbonded polyester, which is quite durable, is bonded directly to the upper surface of a limited frame. The frame has peripheral edges that snap over the top edge of the cage to ensure a good seal. The vertical thickness of the frame is minimal, allowing the cover to be placed over a cage fittable in a cage rack. The area of the cover over the open top of the cage is substantially defined by filter material, which extends over the full area of the top of the cage and frame, save an opening for a valve to align with the air supply opening in the rack. Thin webs extend across the cage top from the periphery of the frame of the cover to support the filter material without substantially blocking the air exchange area. A valve structure in the form of a spring leaf is carried in the frame by means of support webs that extend inwardly from the frame edge, the spring leaf blocking and unblocking the opening in the filter material for air supply when the cage is removed and inserted into the cage rack, respectively. Air is exhausted to the rack exhaust opening directly through an area of the filter material without webs. An upward protrusion which may be attached to the spring leaf or simply placed on the spring leaf, contacts the underside of the rack shelf for uncovering the supply opening. The filter cover as a whole is strong and effective, can be simply autoclaved for cleaning, and protects the animals from contagion while freeing the animal maintenance technician from demanding requirements of cage-cover assembly, cage positioning and the like.

The supply valve allows unrestricted air flow into the cage, eliminating the diffusion of air across the filter media as well as the associated pressure drop that would occur through the filter media if the filter material were disposed across the area of the supply duct opening. This allows the micro-environment within the cage in the rack to remain positively pressurized relative to the room in which the rack is located, even when the exhaust orifice static pressure on the filter media is raised to a level greater than the supply orifice pressure, as long as the differential pressure is less than the pressure drop across the filter media.

SUMMARY OF THE INVENTION

It is an object of the invention to improve the convenience of individually ventilated animal caging systems while effectively isolating animal occupants from airborne contagion during maintenance as well as cage storage.

It is also an object of the invention to provide in an animal caging system the benefits of cage covers and filter covers, without the drawbacks of either.

It is a further object of the invention to provide an improved filter cover for an animal cage that is fully operable with an individual cage ventilation rack.

It is still another object of the invention to provide an improved and simplified cage cover valve structure that is inexpensive, dependable, and non-demanding in terms of cage maintenance and positioning.

These and other objects are accomplished by a ventilated caging system of the type having ducted shelves with lower planar surfaces for box-like animal enclosures, the shelves having duct openings for powered supply and exhaust of air to the animal cages, has valved filter covers operable to isolate the animal enclosure from ingress and egress of airborne particles. The filter cover has a frame sealingly engaging a perimeter of the cage, the frame carrying a filter membrane with at least one opening. A support web integral with the frame extends inwardly of the perimeter within the frame to support a valve. A movable valve body is mounted on the support web, the valve body including a blocking portion resiliently urged to block said opening in the filter membrane, and a contact portion protruding through the opening by an opening displacement of the valve body, the blocking portion being displaced by the contact portion when the cage is fitted in the ventilating rack, whereupon the valve is opened, and the blocking portion being resiliently released to cover the opening when the cage is removed from contact with the ventilating rack, whereupon the valve is closed. The blocking portion is preferably a stainless steel leaf spring which fits in a frame web defining a partial enclosure, the leaf spring being attached to the frame web at one end. The contact portion can be a protrusion attached to the leaf spring at a space from its attachment to the frame web. Alternatively, the contact portion can be a separable element such as a ball bearing, captive between the leaf spring and a semi-cylindrical opening in the frame web, and operable to push the leaf spring back from its covered opening when the cage is inserted into the rack.

BRIEF DESCRIPTION OF THE DRAWINGS

There are shown in the drawings the embodiments of the invention as presently preferred. It should be understood that the depicted embodiments are exemplary and that the invention is subject to certain variations within the scope of the present disclosure and claims. In the drawings:

FIG. 4 is a partial perspective view of the filter cover according to the invention, showing details of the valve structure, from the underside;

FIG. 5 is a partial perspective view of the embodiment of the FIG. 4, from the top;

FIG. 6 is a section view of an alternative embodiment of the valved cover, taken along line 6-6 in FIG. 1.

DETAILED DESCRIPTION OF THE PREFERRED EMBODIMENTS

Figure 1:
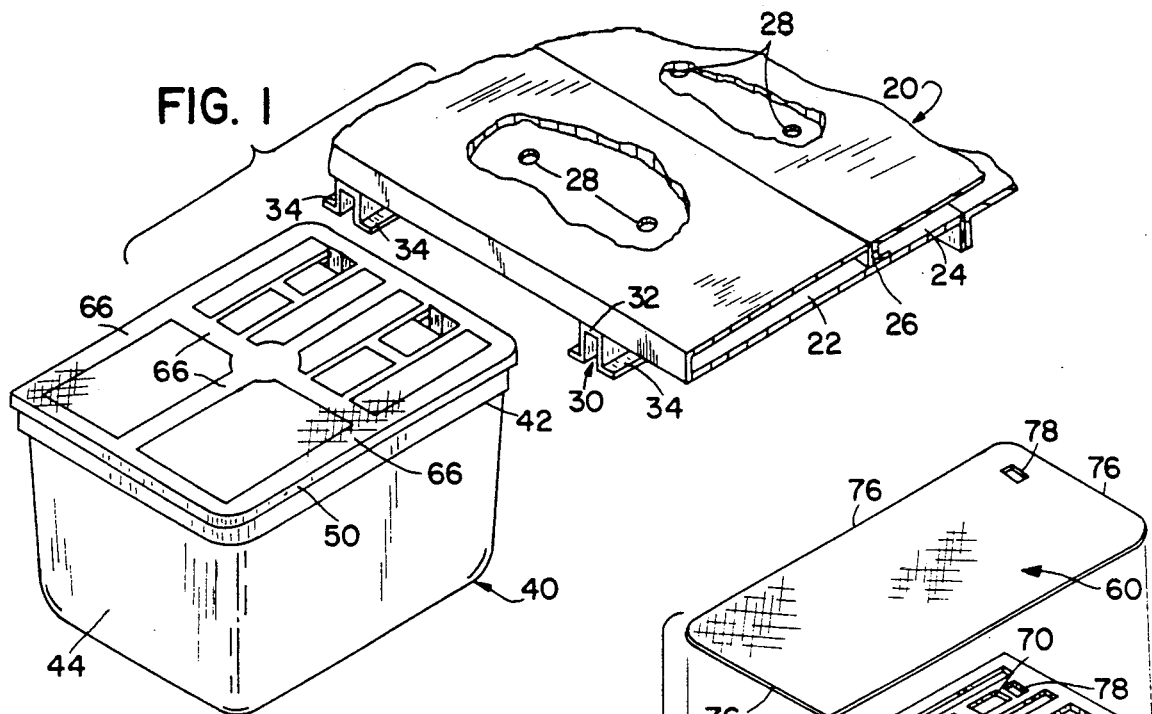
FIG. 1 is a partial perspective view of an animal caging system according to the invention.

FIG. 1 illustrates an animal caging system according to the invention, in a partial perspective view. A plurality of cages 40 are supported against an internally ducted shelf 20 such that air supply and air exhaust ducts in the rack lead to and from an area within the open periphery at the top of the each of the cages 40. The cages 40 are airtight boxes having a body including four integral sidewalls and a bottom, for example of molded polycarbonate or the like, and an open top. The top is closed by a cover 50 that snaps onto the cage 40 at its upper open periphery. The cover has large areas of filter material supported by the cover and thereby allows air exchange but prevents airborne particles from falling into the internal area occupied by the animals, for example laboratory mice, rats, etc.

The ducted shelf 20 may be one of a number of vertically stacked shelves which attach to a side plenum with ducts corresponding in position to ends of internal shelf ducts 22, 24, for providing a powered supply of fresh air to the internal ducts 22, 24 of the shelf 20. The shelf 20 can be a sheet metal structure having walls folded and attached together via partitions 26 to keep the supply and exhaust sides isolated from one another. In the embodiment shown, a central duct 24 supplies air to cages 40 on both sides of the shelf (only one cage on one side is shown), and a laterally spaced duct 22 exhausts air from the cage on the side shown, another similar duct being provided on the other side of central duct 4. Each of the ducts 22, 24 communicates with the cages 40 by means of openings 28 in the duct wall. The cage 40 is arranged to be removably mounted to the shelf 20 such that at least one opening to supply duct 24 and at least one opening to exhaust duct 22 communicates with each cage 40. In the example of FIG. 1, two supply openings and two exhaust openings communicate through the filter cover with the cage 40.

The cages can be slid under the shelves to align the top of the airtight body portion 44 of each cage to the openings 28 in the ducts. The periphery of the airtight body portion occupies a plane, as does the underside of the shelf 20. The cages can be urged against the ducts by flange members 30, rigidly mounted to the shelf 20, and having flanges 34 which engage under the laterally protruding flanges 42 of the cages 44. The cage flanges are integral with the cage bodies 44, and are of substantially the same width as the spacing between the shelf flanges 34 and the underside of the shelf. Accordingly, each cage is urged against the shelf 20 when slid onto the flanges 34. The flanges 34 can be the ends of the legs of U-shaped structures 30, which attach to the shelf by fasteners (not shown) passed through the central portions of members 30.

The box-like cages 40 are each covered on their otherwise open tops by filter covers 50. Therefore, when removed from the positions under the shelf 20, the cages remain protected against airborne particles which may carry pathogens. As so protected, the cages can be transported to a service station and uncovered only therein for servicing the cage occupants. Preferably, the cage covers have a substantial area of filter material 60, allowing passage of air but blocking passage of particulate material. The preferred filter material is spunbonded polyester, for example as marketed by the Dupont Company, Wilmington, Del., under the trademark Reemay. This material is quite durable, and although flexible has structural strength when fastened in tension in a frame.

According to the invention, the filter material is bonded to a frame 56 such that the filter material is disposed on the uppermost face of the frame 56 and thus comes directly into contact with the underside of the shelf 30. The frame 56 is a plastic resin material and the spunbonded polyester filter material 60 can be heat bonded to the frame 56, whereby the filter material is placed in tension in the event any forces are applied thereto. Inasmuch as the filter material is at least slightly compressible, the filter material functions in part as a resilient seal between the frame 56 and the underside of the shelf 20.

The frame 56 has a peripheral portion with depending edges 62, enclosing around the outside of the planar open top of the cage body 40. One or more webs 58, which preferably are integral with the peripheral parts of the frame, bridge across the central area over the open top of the cage body 40. At each area where the filter material is disposed over a portion of the frame 56 or the webs 58, the filter material is heat bonded thereto. As a result, the filter material rends to reinforce the frame, providing a relatively strong self-sustaining structure which can be processed apart from the cage body 40, for example for cleaning and/or autoclaving.

Figure 2:
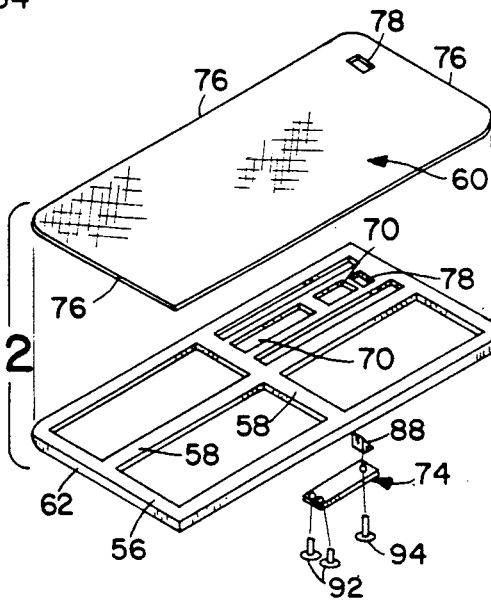
FIG. 2 is an exploded perspective view of a valved filter cover according to the invention.
Figure 3:
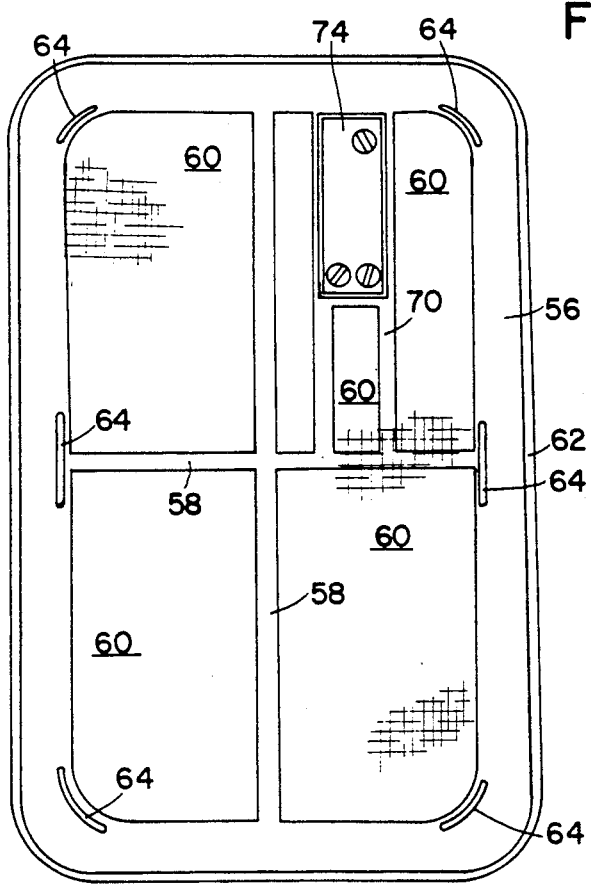
FIG. 3 is a plan view of the valved filter cover according to FIG. 2, from the underside.

The cage and filter cover shown in FIG. 1 are double width versions, as used for breeding cages. The cage can also be a single width variety as shown in FIGS. 2 and 3, being substantially identical to the double width version except adapted for mounting on more closely-spaced shelf flanges 34. In each case the filter cover is thin but substantially stiff arrangement due to the bonded filter and frame, that is placed over the open top of the cage. When the cage is inserted in the rack, the cover remains in place.

FIG. 2 illustrates the filter cover in exploded view and FIG. 3 shows the filter cover from the underside. The filter cover is valved in a manner permitting the cage to be sealed automatically when removed from its position under the rack or shelf 20. The frame 56 is dimensioned to sealingly engage the perimeter of the cage body 40, having a minimal thickness in an area overlying the perimeter of the cage, and enclosing over the cage edge. A support web 70 is attached to the frame, the support web 70 being adapted to carry a movable valve body 74 operable to uncover an opening through the filter material. The valve body 74 and/or a contact member 88 operative to move the valve body 74 are placed at a position where the valve body will be opened due to contact between the inserted cage and the shelf 20, and allowed to close due to lack of such contact when the cage is removed from the shelf. The support web extends inwardly of the perimeter within the frame, for example bridging between the peripheral frame 56 and one or more of the webs 58 which extend inwardly from the frame 56. The filter membrane 6 is sealed to the frame 56 and preferably also to webs 56, 58. Across the full area of the filter membrane (i.e., at all the areas 78 over the cover between the webs 56, 58, as well as areas bonded to the frame and webs), the filter membrane, frame and webs block passage of airborne particles.

The filter membrane has at least one opening 78, adjacent the support web 70, where the valve body movably opens and closes an air passage. This passage communicates with the supply side internal duct 24 of the shelf 20. The movable valve body 74 is mounted on the support web 70, the valve body including a blocking portion resiliently urged to block said opening 78 in the filter membrane 60. A contact portion 88 protruding through the opening by an opening displacement of the valve body, the blocking portion being displaced by the contact portion when the cage is fitted in the ventilating rack, whereupon the valve is opened, and the blocking portion being resiliently released to cover the opening when the cage is removed from contact with the ventilating rack, whereupon the valve is closed.

It is possible to arrange valve structures operable by contact with the shelf 20 on both the air inlet and air exhaust sides of the cage. According to the preferred embodiment, only the supply side is valved. The exhaust opening, which is more likely to release airborne dust, dander and the like into the duct system, is preferably permanently protected by areas of filter material. Inasmuch as the air supply side is powered and not subject to blocking or clogging, omitting the valve on the exhaust side enables some escape of air even if the exhaust side area (i.e., the area of the filter cover under the respective exhaust passage into the shelf duct 22) becomes clogged.

When the supply valve opens by contact with the rack, it allows unrestricted air flow into the cage. This eliminates the diffusion of air across the filter media as well as the associated pressure drop that would occur through the filter media if the filter material were disposed across the area of the supply duct opening. On the exhaust side, the filter material does produce a pressure drop. As a result of the unrestricted supply and restricted exhaust relative to the cage, the micro-environment within the cage in the rack remains positively pressurized relative to the room in which the rack is located. Airborne dust and dander cannot be drawn to the cage to accumulate on the filter cover. The positive pressure differential relative to the room exists even when the exhaust duct is operated at a higher static pressure (vacuum) on the filter media than the unrestricted supply orifice pressure, as long as the differential pressure between the supply and the exhaust is less than the pressure drop across the filter media. Therefore, the exhaust side can be operated at sufficient vacuum to draw odors and the like from the room, while the positive pressure in the cage prevents the cage from picking up dust. Preferably, the respective shelf ducts are provided with manometers and the like for sensing and adjustment of the static pressures in the supply and exhaust ducts to maintain this condition.

In the preferred embodiment shown, the frame includes a plurality of webs 58 disposed across the open perimeter edge of the cage 40. The support web 70 carrying the valve is attached to at least one of the frame and the plurality of webs. As shown, the webs 58 can define a supporting spider passing between opposite areas of the frame. The support web 70 runs from the peripheral frame 56 to one of the central webs of the spider. As shown in FIG. 2, the filter membrane 60 is fully as wide as the outer edges of the frame 56. The filter material is heat bonded or otherwise sealingly attached to the frame elements over the full area of the top of the cage body 40, at least along substantially the entire perimeter of the cage body 40 on the side directed outwardly of the cage toward the ventilating rack or shelf 20. Preferably, the filter membrane 60 is bonded to the frame 56, the support web 70 and the plurality of webs 58, at each point where these parts overlap.

The valve body 74 preferably includes a spring strip, for example a length of stainless steel leaf spring, attached to the support web 70 at a space from the opening 78 passing through the filter membrane 60. The spring strip is normally disposed coplanar with the frame 56. The contact portion 88 is attached to the spring strip or engaged against the spring strip at a space from an attachment of the spring strip to the support web 70. The contact portion 88 protrudes through the opening 78 in the filter membrane 60. When the cage 40 is inserted under the shelf 20, the lower portion of the shelf 20 contacts the contact portion 88 and forces the valve open as the cage goes under the shelf 20.

FIG. 4 illustrates the valve mounting from the underside of the cover, in detail. The support web 70 forms a box-like depression 86 for the spring strip and thus laterally encloses the spring strip when the valve is closed. The depression 86 preferably is such that the support web 70 has an extension inwardly of the cage that is less than the opening displacement of the valve body. The opening displacement of the valve body is due in part to the vertical extension of the contact member 88 that protrudes upwardly from the filter cover and contacts the shelf 20. As shown in FIG. 5, which illustrates the valve area of the cage cover from the top, the contact member can be a sloping or tapered body attached to the end of the spring leaf such that insertion of the cage causes the shelf edge to ride over the taper and force the contact member 88 downwardly.

FIGS. 2-6 show the valve body as a metal spring strip, attached to the support web by means of screws. It will be appreciated that other fasteners and fastening means as well as other materials are possible. For example, a metal spring strip can be riveted to the frame or merely received in a receptacle in the frame. The strip can also be a plastic resin and can be heat welded or adhesively bonded to the frame. The strip as shown is attached to the frame simply via screws. A cover plate (not shown) in the area of the frame attachment screws 92 can be provided as well. Likewise the contact member 88 can be attached by a different type of fastener than the illustrated screw 94, or as shown in FIG. 6, the contact member can open the valve without being rigidly attached to the spring strip at all.

In FIG. 6, the area of the filter cover at least directly over the valve body is not covered with filter material (i.e., the valve could be used with a wholly airtight cover as shown). Preferably, however, the areas of the cover remote from the valve are provided with open areas between frame and web elements, which areas are covered by a filter membrane such a spunbonded polyester, bonded to all the upper surfaces of an integral frame and web of plastic resin. A hole 106 in the cover over the valve strip 100 is either opened or closed by action of a ball shaped contact member 102, which is not attached directly to the valve strip 100. In this embodiment, the contact ball 102 is captured between the spring strip 100 and the filter cover by means of a tapering or Conical hole 104 which allows the ball 102 to move downwardly but limits the extent of upward movement of the ball 102. When the valve is at rest (i.e., when the cage has been removed from the rack), spring strip 100 forces the ball upwardly in the tapered hole 104, whereupon the valve is closed as shown on the left in FIG. 6, the spring strip 100 blocking the opening 106 in the cover. As the cage is slid under the shelf 20, as shown on the right in FIG. 6, the lower wall of the shelf pushes the ball 102 downwardly against the spring strip 100. The ball is preferably disposed closer to the point of attachment of the spring strip 100 than is the opening 106. Therefore, a relatively smaller displacement of the ball 102 results in a relatively larger displacement of the spring strip in the area of the opening 106. As shown in FIG. 6, the displacement can be arranged such that the ball motion causes the distal end of the spring strip to be pushed inwardly of the cage to a point at which the end of the spring strip is disposed inwardly of the sides of the receptacle box 86 formed in the cover or the support web therein.

In FIG. 6 an alternative embodiment of the filter material is shown on the right side. According to this embodiment, a limited area of filter material 108 is placed in a counterbore in the upper surface of the cage cover, overlapping the opening 106. As shown on the left side of FIG. 6, the opening can be unobstructed. It is presently preferred that an opening 106 leading to the air supply duct of shelf 20 be unobstructed. If a valved opening is provided to the exhaust duct, then a supplemental filter pad can be included to prevent airborne dust for entering the exhaust duct and possibly being passed to a cage downstream along the airflow path in the exhaust duct.

According to the embodiment of FIG. 6, the valved cover 50 comprises a frame engageable with the perimeter of the animal cage, a valve body 100 movably disposed over an opening 106, the valve body including a strip attached to the frame at a space from the opening, the strip at rest residing across the opening 106 to block airflow through the opening, and, a contact member 102 dimensioned to protrude from the valve cover, the contact member being operative when depressed to press the strip back from the opening. The contact member 102 is captive between the strip and a tapering opening 104 in a member attached to the frame, in the form of a ball captured between the strip and a tapering opening in said member attached to the frame. The ball is disposed between the opening and a point of attachment between the strip and the cover.

The invention concerns both a filter cover and an overall caging system employing the filter cover. In addition to the filter cover as described herein, the system is a ventilated caging system with at least one ducted body 20 with a planar surface having duct openings 28 for supply and exhaust of air. Powered ventilating means supply air and exhaust air through the ducted body, to and from the duct openings 28. A plurality of animal cages, each of the cages having substantially airtight walls defining five sides of an animal enclosure and having an open planar side to be fitted against said planar surface of the ducted body, are suspended under or otherwise urged into contact with the ducted body via support means operable to urge the cages into a position wherein the open planar side is fitted against the planar surface of the ducted body. The valved filter covers as described are then operable to isolate the animal enclosure from ingress and egress of airborne particles.

The invention having been disclosed, a number of variations and alternative embodiments will now become apparent to persons skilled in the art. Reference should be made to the appended c aims rather than the foregoing specification as indicating the true scope of the invention in which exclusive rights are claimed.

I claim:

1. A cover for an animal cage of the type having an enclosure body opening at a perimeter residing in a plane, the cage being removably fittable in a ventilating rack with the perimeter disposed against mean associated with the rack providing powered airflow through the animal cage, the cover comprising:
   a frame dimensioned to sealingly engage the perimeter of an area of the cage, the frame having a minimal thickness in the perimeter of the cage, whereby the cage can be fitted into the ventilating rack with the frame in place on the perimeter;
   a support web attached to the frame, the support web extending inwardly of the perimeter within the frame;
   a filter membrane sealed to the frame, the filter membrane
   blocking passage of airborne particles, the filter membrane having an opening adjacent the support web; and,
   a movable valve body mounted on the support web, the valve body including a blocking portion resiliently urged to block said opening in the filter membrane, and a contact portion protruding through the opening by an opening displacement of the valve body, the blocking portion being displaced by the contact portion when the cage is fitted in the ventilating rack, whereupon the valve is opened, and the blocking portion being resiliently released to cover the opening when the cage is removed from contact with the ventilating rack, whereupon the valve is closed.

2. The cage cover according to claim 1, wherein the frame includes a plurality of webs disposed across the perimeter of the cage, said support web being attached to at least one of the frame and the plurality of webs.

3. The cage cover according to claim 2, wherein the plurality of webs include at least one web substantially crossing the perimeter, and wherein the support web extends between the frame and said at least one web.

4. The cage cover according to claim 1, wherein the filter membrane is bonded to the frame along substantially the entire said perimeter on a side directed outwardly of the cage toward the ventilating rack.

5. The cage cover according to claim 2, wherein the filter membrane is bonded to the frame, the support web and the plurality of webs 6. The cage cover according to claim 2, wherein the valve body includes a spring strip attached to the support web at a space from the opening in the filter membrane, the spring strip being normally disposed coplanar with the frame, the contact portion being attached to the spring strip at a space from an attachment thereof to the support web, the contact portion protruding through the opening in the filter membrane.

7. The cage cover according to claim 6, wherein the support web laterally encloses the spring strip, the support web having an extension inwardly of the cage that is less than the opening displacement of the valve body.

8. The cage cover according to claim 7, wherein the filter membrane is bonded to the frame and to the support web along all surfaces thereof directed outwardly of the cage.

9. The cage cover according to claim 8, wherein the frame is plastic resin and the filter membrane is spunbonded polyester resin and is heat bonded to the frame.

10. The cage cover according to claim 9, wherein the frame, support web and plurality of webs are integrally molded plastic resin and wherein the plurality of webs include webs crossing centrally over the perimeter of the enclosure body, the support web extending from at least one of the central webs to the frame.

11. A valved cover for an animal cage having a box-like airtight body opening at a perimeter, the perimeter to be placed in proximity with a duct means for establishing air communication with the animal cage, the valved cover comprising:
   a frame engageable with the perimeter of the animal cage;
   a valve body movably disposed over the opening, the valve body including a strip attached to the frame at a space from the opening, the strip at rest residing across the opening to block airflow through the opening; and,
   a contact member dimensioned to protrude from the valve cover, the contact member being operative when depressed perpendicular to a plane defined by said perimeter to press the strip back from the opening, the contact member being disposed between the strip and an opening in a member attached to the frame.

12. The valved cover according to claim 11, wherein the contact member is attached to the strip.

13. The valved cover according to claim 11, wherein the contact member is captive between the strip and the opening in said member by means of the opening being tapered to engage the contact member.

14. The valved cover according to claim 13, wherein the contact member is a ball member.

15. The valved cover according to claim 11, wherein the valved cover has an air passing filter material disposed across areas of the cover adjacent the opening.

16. The valved cover according to claim 15, wherein the contact member is a ball member and is captured between the strip and a tapering opening in said member attached to the frame.

17. The valved cover according to claim 16, wherein the ball is disposed between the opening and a point of attachment between the strip and the cover.

18. A ventilated caging system, comprising:
at least one ducted body with a planar surface having duct openings for supply and exhaust of air;
powered ventilating means supplying air and exhausting air
a plurality of animal cages, each of the cages having substantially airtight walls defining five sides of an animal enclosure and having an open planar side to be fitted against said planar surface of the ducted body;
support means operable to urge the cages into a position wherein the open planar side is fitted against the planar surface of the ducted body;
a valved filter cover operable to isolate the animal enclosure from ingress and egress of airborne particles, the filter cover including a frame dimensioned to sealingly engage a perimeter of the open planar side of the cage;
a support web attached to the frame, the support web extending inwardly of the perimeter within the frame;
a filter membrane sealed to the frame, the filter membrane blocking passage of airborne particles, the filter membrane having an opening adjacent the support web; and,
a movable valve body mounted on the support web, the valve body including a blocking portion resiliently urged to block said opening in the filter membrane, and a contact portion protruding through the opening by an opening displacement of the valve body, the blocking portion being displaced by the contact portion when the cage is fitted in the ventilating rack, whereupon the valve is opened, and the blocking portion being resiliently released to cover the opening when the cage is removed from contact with the ventilating rack, whereupon the valve is closed.

19. The cage cover according to claim 18, wherein the frame includes a plurality of webs disposed across the perimeter of the cage, said support web being attached to at least one of the frame and the plurality of webs, at least one said web substantially crossing the perimeter, the support web extending between the frame and said at least one web, the filter membrane being bonded to the frame along substantially the entire said perimeter on a side directed outwardly of the cage toward the ventilating rack.

20. The cage cover according to claim 19, wherein the valve body includes a spring strip attached to the support web at a space from the opening in the filter membrane, the spring strip being normally disposed coplanar with the frame, the contact portion being attached to the spring strip at a space from an attachment thereof to the support web, the contact portion protruding through the opening in the filter membrane.

* * * * *